(12) United States Patent
Simms

(10) Patent No.: US 6,446,387 B1
(45) Date of Patent: Sep. 10, 2002

(54) CONVERSION KIT FOR CHAIRS

(76) Inventor: Michael Simms, 19 Esterly Farms Rd., Madison, CT (US) 06443

( * ) Notice: Subject to any disclaimer, the term of this patent is extended or adjusted under 35 U.S.C. 154(b) by 0 days.

(21) Appl. No.: 09/961,975

(22) Filed: Sep. 24, 2001

(51) Int. Cl.⁷ .......................... A01G 9/02; A47C 13/00
(52) U.S. Cl. ........................................ 47/66.6; 297/129
(58) Field of Search ................. 47/65.5, 66.6, 47/39, 84, 66.7; 206/223; 297/129, 118

(56) References Cited

U.S. PATENT DOCUMENTS

| | | | | |
|---|---|---|---|---|
| 3,987,996 A | * | 10/1976 | Yocca | 248/524 |
| 4,917,238 A | * | 4/1990 | Schumacher | 206/223 |
| 5,996,813 A | * | 12/1999 | Hendrix et al. | 211/13.1 |
| 6,179,306 B1 | * | 1/2001 | Maxwell | 280/43.1 |

FOREIGN PATENT DOCUMENTS

DE          2365318    *  9/1976  ........... A47C/13/00

* cited by examiner

*Primary Examiner*—Peter M. Poon
*Assistant Examiner*—Son T. Nguyen
(74) *Attorney, Agent, or Firm*—Goldstein & Lavas, P.C

(57) ABSTRACT

A conversion kit for chairs including a porous sheet of fiberglass having a generally rectangular configuration. The porous sheet is dimensioned for covering a seat of a chair. A sheet of plastic is included having a generally rectangular configuration. The sheet of plastic is dimensioned for covering the seat of the chair. The kit also includes a pair of gloves, a quantity of flower seeds, and a quantity of Spanish moss.

2 Claims, 3 Drawing Sheets

Fig. 4
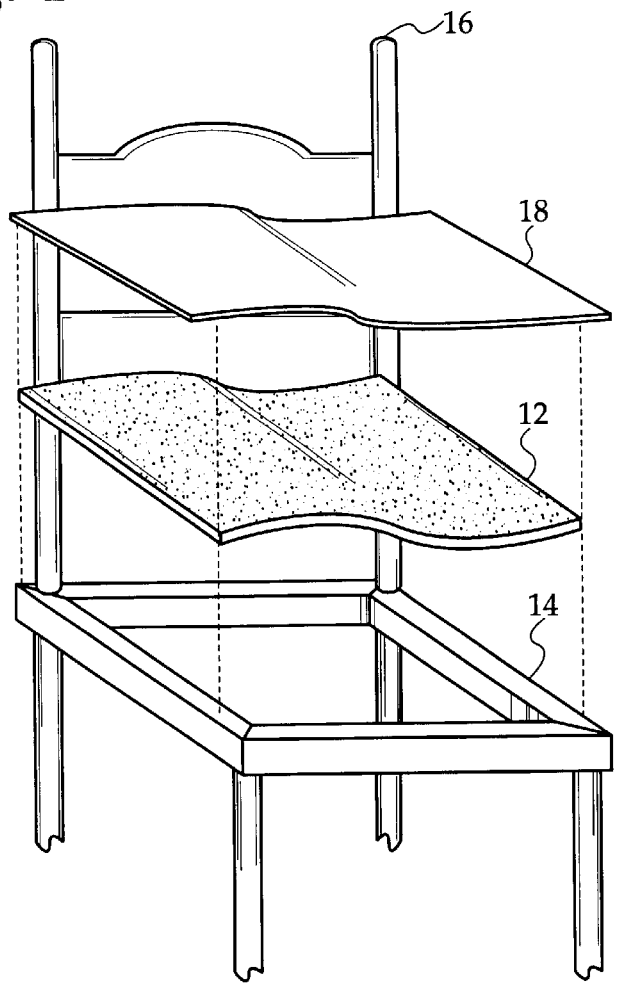
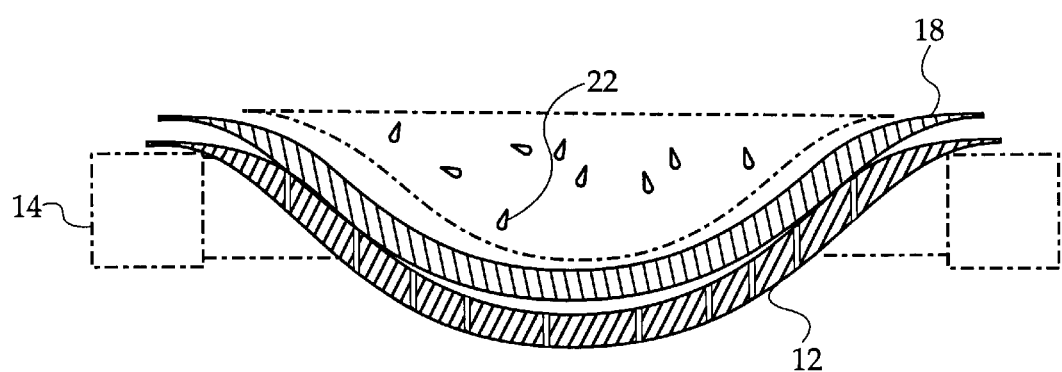
Fig. 5

CONVERSION KIT FOR CHAIRS

BACKGROUND OF THE INVENTION

The present invention relates to a conversion kit for chairs and more particularly pertains to allowing a chair to be converted into a planter.

The use of plant holders is known in the prior art. More specifically, plant holders heretofore devised and utilized for the purpose of holding plants and flowers are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a conversion kit for chairs for allowing a chair to be converted into a planter.

In this respect, the conversion kit for chairs according to the present invention substantially departs from the conventional concepts and designs of the prior art, and in doing so provides an apparatus primarily developed for the purpose of allowing a chair to be converted into a planter.

Therefore, it can be appreciated that there exists a continuing need for a new and improved conversion kit for chairs which can be used for allowing a chair to be converted into a planter. In this regard, the present invention substantially fulfills this need.

SUMMARY OF THE INVENTION

In the view of the foregoing disadvantages inherent in the known types of plant holders now present in the prior art, the present invention provides an improved conversion kit for chairs. As such, the general purpose of the present invention, which will be described subsequently in greater detail, is to provide a new and improved conversion kit for chairs which has all the advantages of the prior art and none of the disadvantages.

To attain this, the present invention essentially comprises a porous sheet of fiberglass having a generally rectangular configuration. The porous sheet is dimensioned for covering a seat of a chair. A sheet of plastic is included having a generally rectangular configuration. The sheet of plastic is dimensioned for covering the seat of the chair. The kit also includes a pair of gloves, a quantity of flower seeds, and a quantity of Spanish moss.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved conversion kit for chairs which has all the advantages of the prior art plant holders and none of the disadvantages.

It is another object of the present invention to provide a new and improved conversion kit for chairs which may be easily and efficiently manufactured and marketed.

It is a further object of the present invention to provide a new and improved conversion kit for chairs which is of durable and reliable construction.

An even further object of the present invention is to provide a new and improved conversion kit for chairs which is susceptible of a low cost of manufacture with regard to both materials and labor, and which accordingly is then susceptible of low prices of sale to the consuming public, thereby making such a conversion kit for chairs economically available to the buying public.

Even still another object of the present invention is to provide a new and improved conversion kit for chairs for allowing a chair to be converted into a planter.

Lastly, it is an object of the present invention to provide a new and improved conversion kit for chairs including a porous sheet of fiberglass having a generally rectangular configuration. The porous sheet is dimensioned for covering a seat of a chair. A sheet of plastic is included having a generally rectangular configuration. The sheet of plastic is dimensioned for covering the seat of the chair. The kit also includes a pair of gloves, a quantity of flower seeds, and a quantity of Spanish moss.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an exploded perspective view of the present invention.

FIG. 5 is a cross-sectional side view of the present invention.

The same reference numerals refer to the same parts through the various figures.

DESCRIPTION OF THE PREFERRED EMBODIMENT

Figure 1:
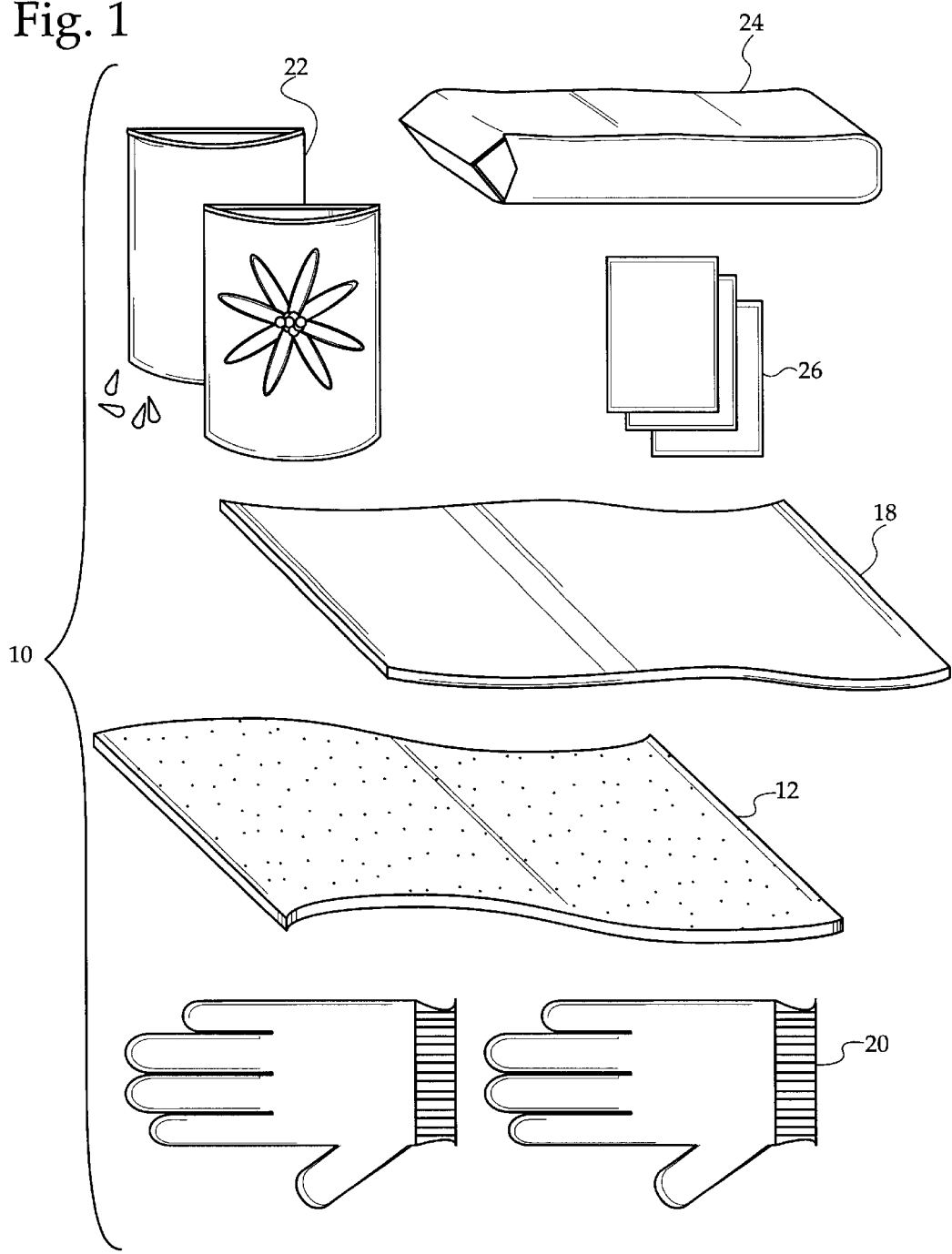
FIG. 1 is a perspective view of the preferred embodiment of the conversion kit for chairs constructed in accordance with the principles of the present invention.
Figure 2:
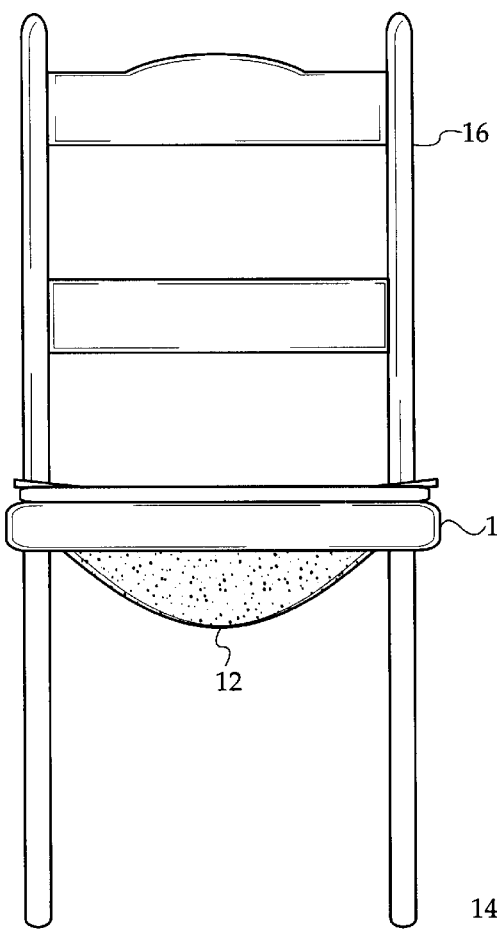
FIGS. 2 and 3 are front views of the present invention at different stages of conversion.
Figure 3:
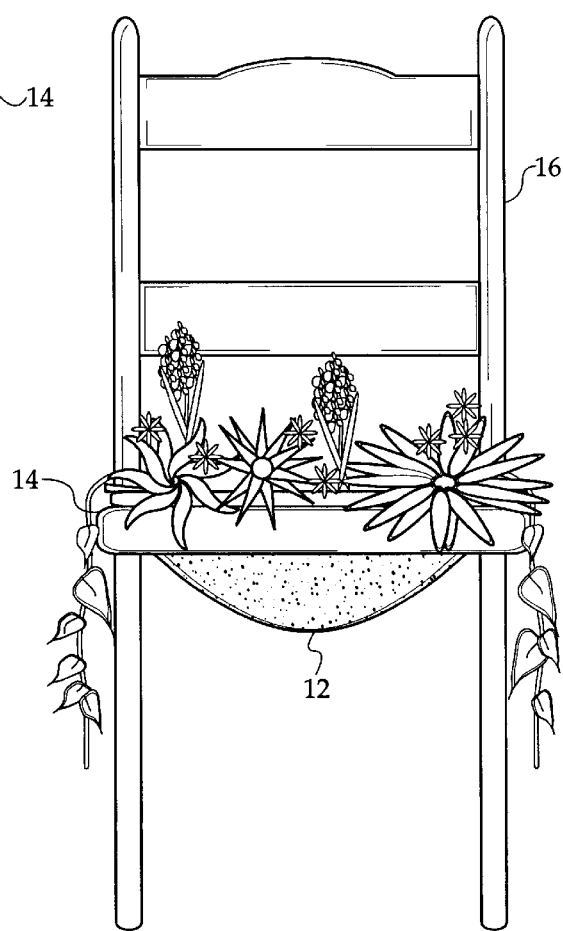

With reference now to the drawings, and in particular, to FIGS. 1 through 5 thereof, the preferred embodiment of the new and improved conversion kit for chairs embodying the principles and concepts of the present invention and generally designated by the reference number 10 will be described.

Specifically, it will be noted in the various Figures that the device relates to a conversion kit for chairs for allowing a chair to be converted into a planter.

The kit 10 includes a porous sheet of fiberglass 12 having a generally rectangular configuration. The porous sheet 12 is dimensioned for covering a seat 14 of a chair 16. A sheet of plastic 18 is included having a generally rectangular configuration. The sheet of plastic 18 is dimensioned for covering the seat 14 of the chair 16. The kit 10 also includes a pair of gloves 20, a quantity of flower seeds 22, and a quantity of Spanish moss 24. The kit 10 additionally includes detailed instructions 26 for its use.

To use the kit 10, the first thing that is needed is chair 16 that no longer is being used as a seat. The seat 14 of the chair 16 is removed. The chair 16 can then be painted or stained according to the taste of the user. The porous sheet of fiberglass 12 is positioned over the seat opening created from the removal of the seat 14. The fiberglass 12 is secured to the seat opening using a staple gun or the like ensuring that a pouch is created of between three and four inches. Using a scissors, any excess overlap of the fiberglass 12 can be removed. Next, the plastic sheet 18 is taken and punched with holes using an awl or nail. Once this step has been complete, the plastic sheet 18 can be secured to the seat 14 directly over the sheet of fiberglass 12. Next, potting soil is placed within the pouch over the sheets of fiberglass 12 and plastic 18. The soil should be watered thoroughly to make sure the water drains through the plastic sheet 18 and the fiberglass 12. The seeds 22 can then be placed within the soil to grow. Alternately, grown plants and flowers can be planted in the soil. Lastly, the Spanish moss 24 can be used to cover the soil to enhance the appearance.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A conversion kit for chairs for allowing a chair to be converted into a planter comprising, in combination:

a porous sheet of fiberglass having a generally rectangular configuration, the porous sheet being dimensioned for covering a seat of a chair;

a sheet of plastic having a generally rectangular configuration, the sheet of plastic being dimensioned for covering the seat of the chair;

a pair of gloves;

a quantity of flower seeds; and a quantity of Spanish moss.

2. A conversion kit for chairs and method for allowing a chair to be converted into a planter comprising, in combination:

providing a standard chair having a sitting portion with a seat portion disposed therein;

removing the seat portion from the sitting portion;

providing a porous sheet of fiberglass;

securing the porous sheet of fiberglass over the sitting portion to form a holding pouch;

providing a sheet of plastic;

punching a plurality of holes through the sheet of plastic;

securing the sheet of plastic to the sitting portion over the porous sheet of fiberglass;

pouring a quantity of potting soil onto the sheet of plastic and the porous sheet of fiberglass to fill the holding pouch;

providing a quantity of plant seeds for planting in the potting soil; and providing a quantity of Spanish moss for placement over the potting soil.

\* \* \* \* \*